United States Patent [19]
Cain et al.

[11] Patent Number: 5,891,495
[45] Date of Patent: *Apr. 6, 1999

[54] ICE-CREAM COATING FATS

[75] Inventors: Frederick William Cain, Voorburg; Helga Gerda A. Manson née van der Struik, Amstelveen, both of Netherlands; Paul Thomas Quinlan, Kempston; Stephen Raymond Moore, Thrapston, both of Great Britain

[73] Assignee: Loders-Croklaan B.V., Wormerveer, Netherlands

[*] Notice: This patent issued on a continued prosecution application filed under 37 CFR 1.53(d), and is subject to the twenty year patent term provisions of 35 U.S.C. 154(a)(2).

[21] Appl. No.: 727,582

[22] PCT Filed: Apr. 25, 1995

[86] PCT No.: PCT/EP95/01572

§ 371 Date: Oct. 29, 1996

§ 102(e) Date: Oct. 29, 1996

[87] PCT Pub. No.: WO95/29596

PCT Pub. Date: Nov. 9, 1995

[30] Foreign Application Priority Data

Apr. 29, 1994 [EP] European Pat. Off. ............... 94303170

[51] Int. Cl.⁶ ..................................................... A23D 9/00
[52] U.S. Cl. ........................... 426/101; 426/607; 426/659
[58] Field of Search ................................... 426/101, 100, 426/103, 659, 607, 606, 611, 612

[56] References Cited

U.S. PATENT DOCUMENTS

| | | | |
|---|---|---|---|
| Re. 30,722 | 8/1981 | Olds | 426/101 |
| 4,018,806 | 4/1977 | Wyness | 426/607 |
| 4,379,176 | 4/1983 | Scherwitz . | |
| 4,394,392 | 7/1983 | Tresser | 426/101 |
| 4,396,633 | 8/1983 | Tresser | 426/606 |
| 4,414,239 | 11/1983 | Oven | 426/101 |
| 4,430,350 | 2/1984 | Tresser | 426/606 |
| 4,560,563 | 12/1985 | Tresser | 426/103 |
| 4,656,045 | 4/1987 | Bodor | 426/612 |
| 5,011,704 | 4/1991 | Smagula | 426/101 |
| 5,017,392 | 5/1991 | Bombardier | 426/101 |
| 5,215,780 | 6/1993 | Meidenbauer | 426/101 |
| 5,273,763 | 12/1993 | Merz | 426/101 |
| 5,431,947 | 7/1995 | Bennett | 426/607 |
| 5,431,948 | 7/1995 | Cain | 426/607 |
| 5,556,659 | 9/1996 | De Pedro | 426/101 |

FOREIGN PATENT DOCUMENTS

| | | |
|---|---|---|
| 0023151 | 1/1981 | European Pat. Off. . |
| 0402090A3 | 12/1990 | European Pat. Off. . |
| 0 424 997 A2 | 5/1991 | European Pat. Off. . |
| 04779351A1 | 1/1992 | European Pat. Off. . |
| 0483414 | 5/1992 | European Pat. Off. . |
| 5236919 | 9/1993 | Japan . |

OTHER PUBLICATIONS

Swern 1979 Baileyr Industrial Oil and Fat Products vol. 1, 4th ed. Wiley–Interscience New York pp. 352, 363, 368 374 382, 387, 389, 407.

*Primary Examiner*—Carolyn Paden
*Attorney, Agent, or Firm*—Pillsbury Madison & Sutro LLP

[57] ABSTRACT

Novel ice-cream coating fats based on diglycerides comprise at least 30 wt. %, preferably 50–90 wt. %, of diglycerides, which diglycerides have an SU content of 10–25 wt. %, while the total fat composition has a SAFA content of 5–35 wt. % and an N line (unstab.) of $N_{20}<35$ and $N_{25}<10$.

7 Claims, No Drawings

ICE-CREAM COATING FATS

This application is the national phase of International application PCT/EP95/01572, filed Apr. 25, 1995 which designated the U.S.

BACKGROUND OF THE INVENTION

Ice-cream coating fats known so far are mainly based on triglycerides, in particular triglycerides containing medium-chain fatty acid residues, such as lauric acid residues. Typical examples of such fats are disclosed in, e.g., EP 23,150, U.S. Pat. Nos. 5,017,392, 4,560,563, 4,086,370 and 3,959,516. However, hydrogenated vegetable non-lauric fats and triglycerides high in polyunsaturated fatty acids are also known as ice-cream coating fats, e.g. from EP 502,697, EP 246,366, EP 23,151 and U.S. Pat. No. 3,333,968.

Hitherto, no composition has been disclosed that is based on diglycerides and is suitable as ice-cream coating fat.

According to EP 402,090 oil-in-water emulsions are known, in which the fat phase comprises 10–99 wt. % of a diglyceride mixture having an increasing melting point of at most 20° C., which mixture can also contain some monoglycerides, the total glyceride blend having a melting point of 35° C. or below. These emulsions are suitable as cream alternatives and for ice-cream application. For the latter application, however, the emulsion is used for the ice-cream mass and not for the coating of the ice cream.

SUMMARY OF THE INVENTION

We have studied how to develop ice-cream coating fats that have a low SAFA content (a maximum of 35 wt. %) and an N-line that renders them suitable as ice-cream coating fat and which fat composition would be based on the presence of a minimum amount of diglycerides. The above-mentioned study resulted in novel fat compositions being found that are suitable for ice-cream coatings. These novel fat compositions comprise at least 30 wt. %, preferably 50–90 wt. %, of diglycerides, which diglycerides have an SU content of 10–25 wt. % (S=saturated fatty acid residue; U=unsaturated fatty acid residue), while the fat composition displays a SAFA content of 5–35 wt. % and an N line (NMR pulse, not stabilized) of $N_{20}<35$, preferably 1.0–20, more preferably 1.0–5.0; $N_{25}<10$, preferably <1.0.

Although known ice-cream coating fats, such as coconut oil or cocoa butter, have an $N_{20}$ of at least 40, it was found, unexpectedly, that fats with a lower $N_{20}$ can also be applied as ice-cream coating fats; however, the fats should contain enough of the required diglycerides.

DETAILED DESCRIPTION OF THE INVENTION

The above-mentioned finding therefore contradicts the general belief that a high $N_{20}$ is a prerequisite for obtaining high crystallisation rates and acceptable drying times.

In particular, the diglyceride part of our novel fat compositions has a $U_2$ content of 75–90 wt. % and an $S_2$ content below 5 wt. %.

In a preferred embodiment of our invention the fats display an $N_0$ of more than 35, in particular $N_0$=45–80. It was found that, when $N_0>80$, the coating became too brittle, while below $N_0$=35 the coating was too soft. The $N_{20}$ controls the oral mouthfeel (waxiness) and meltdown of our ice-cream coating compositions.

As coconut oil and cocoa butter have relatively high $N_{20}$ values, whereas our fats have low $N_{20}$ values, the oral meltdown of our fat compositions is much shorter than the meltdown of coconut oil- or cocoa butter-based fat compositions.

Our diglyceride compositions are based on diglycerides derived from fatty acid residues with 12–24 C atoms, preferably 16–22 C atoms (for the saturated fatty acid residues (s)), and for the unsaturated fatty acid residues (U) these acids have at least 16 C atoms, preferably 18 C atoms; in particular, U is oleic acid.

Diglycerides can exist as both the sn-1,2 (sn-2,3) and sn-1,3 isomers. Both isomers can be applied in the present invention. In a preferred embodiment of our invention, however, products enriched in the sn-1,3 isomer are applied. Preferably, a ratio of sn-1,3/sn-1,2 diglyceride isomers >2.5 is applied to increase the melting profile of the blend. Diglyceride fractions enriched in the sn-1,3 isomer can be prepared by fractionation (in solvent or dry); solvent fractionation using hexane is preferred.

Our novel fat compositions can also contain some triglycerides. Preferred compositions also comprise 10–50 wt. % of a vegetable triglyceride composition, preferably having a total $(U_3+U_2S)$ content of at least 50 wt. %.

Although our triglyceride compositions can be manufactured by blending of their components, either as pure components or as mixtures of components, a preferred way of producing our fats is by performing a glycerolysis of a liquid oil and glycerol. This glycerolysis can be performed by using an enzyme, preferably a 1,3-specific enzyme, or by using a base, such as sodium methanolate.

The reaction conditions for an enzymatic conversion of a liquid oil with glycerol are typically:

weight ratio oil: glycerol 1:10 to 100:1;

reaction times: 6–120 hours;

temperature: 0–40° C.

enzymes: selected from Rhizopus, Rhizomucor, Pseudomonas, Candida, and preferably Humicola. The enzymes are used in amounts of 100–1000 LU/gm of oil.

The oils that can be applied for the above-mentioned conversion are typically: sunflower oil, high-oleic sunflower oil, safflower oil, high-oleic safflower oil, corn oil, cottonseed oil, rapeseed oil, olive oil and soybean oil.

After separation from residual glycerol, the crude glycerolysis product is processed to produce the final product by evaporation to remove monoglycerides and optionally fractionation (dry or solvent). This can lead to an optimum ratio of diglycerides to triglycerides in the mixture and this post-treatment can be used to control the N values (in all instances NMR pulse measurements were performed on non-stabilised fats, i.e. after the fats had been stored at 0° C. for 90 minutes) or the SAFA content of the product. Sometimes it can be suitable to subject the fats as obtained to a refining treatment (using bleaching earth and steam).

A typical ice-cream coating composition comprises the following formulation:

35–55 wt. % of a polysaccharide, preferably sugar;

25–65 wt. % of the fat composition according to the invention;

0–20 wt % of cocoa powder, preferably 5–15 wt. %;

0–10 wt. % of a milk component, preferably skim-milk powder;

0–2 wt. % of an emulsifier, preferably lecithin.

Part of our invention are also ice creams coated with the above-mentioned ice-cream coating compositions.

EXAMPLE 1

1.1 Glycerolysis of high-oleic sunflower oil

High-oleic sunflower oil (having the composition given below) was reacted with glycerol in a ratio of 5 parts of HOSF oil to 1 part of glycerol by weight, in the presence of Humicola lipase (1000 LU/gm of oil). The reaction time was 24 hours and the temperature was 40° C. After separation from glycerol, monoglycerides were removed by evaporation at 240° C. and 1 mbar pressure. The resulting product was fractionated in hexane at −10° C.; the product obtained was refined by a treatment with bleaching earth and steaming at 190° C. for 4 hours to give a diglyceride-rich fraction of the following composition:

|  | $C_{16:0}$ | $C_{18:0}$ | $C_{18:1}$ | $C_{18:2}$ | $C_{20}$ | % SAFA |
|---|---|---|---|---|---|---|
| Product (= Fat A) | 3.9 | 5.7 | 86.2 | 1.5 | 2.6 | 12.2 |
| HOSF (= Fat B) | 4.0 | 4.7 | 84.3 | 4.9 | 2.1 | 10.8 |

1.2 Preparation of another diglyceride-product (=fat E)

Two diglyceride-rich fat products (an olein and a stearin) were prepared from the glycerolysis of HOSF, followed by separation techniques:

a) 100:20:0.5 by weight of HOSF, glycerol, Lipolase 100 L enzyme (ex-Nove Nordisk) respectively, were stirred at 40° C. for 24 hours.

b) Excess glycerol was decanted off, and monoglycerides/FFA were removed from the crude reaction product (22.1 wt % DG, 3.8 wt % MG) in a falling film evaporator (260° C., 0.3 mm Hg abs.).

c) After refining, the diglyceride rich product was fractionated from hexane (2:1 hexane oil to oil by weight at −12° C.), collecting the olein (16.9 wt % DG, yield 90 wt %) and the stearin (63 wt % DG, 7.8 wt % MG, yield 10 wt %).

d) The olein product had a composition of: 16.9 wt % DG, 0.8 wt % MG DG part 0.0% SS type, 15.1% SU type, 84.8% UU type.

e) The diglyceride content of the olein product was increased by a two-stage silica treatment:
   i) Diglycerides and monoglycerides were absorbed onto silica, using hexane as a solvent (in the proportion 2:1:1 hexane, oil, silica by weight). The silica complex was washed with hexane (2.6:1 hexane to oil by weight) and the wash discarded.
   ii) The silica complex was washed with 88 wt % hexane/12 wt % acetone (3:2:1 wash to oil by weight), and the diglyceride-rich wash collected. A diglyceride-rich fat was formed by evaporation of the hexane/acetone solvent.

f) The diglyceride enriched olein had a composition of: 51.5 wt % DG, 0.1 wt % MG, DG part 0.0% SS type, 16.5 % SU type, 83.5% UU type.

g) Excess monoglycerides were removed from the stearin product via a silica treatment with hexane/acetone (88 wt % hexane, 12 wt % acetone) as the solvent (5:1:1.21 solvent, oil, silica by weight) washed with 3 parts solvent to 1 part oil (by weight). The stearin product was recovered from the wash solvent by evaporation.

h) The silica treated stearin had a composition of: 69.6 wt % DG, 0.3 wt % MG DG part 0.6% SS type, 25.1% SU type, 74.4% UU type.

A diglyceride-rich fat blend was prepared by blending the silica treated stearin and diglyceride enriched olein in the ratio 30:70 by weight. The blend was bleached and deodorised.

The refined blend contained: 55.5 wt DG, 0.1 wt % MG. The DG composition was 0.4 % SS, 21.1 % SU, 78.5 % UU. The FAME profile of the total blend was (wt %):

| 14:0 | 16:0 | 16:1 | 18:0 | 18:1 | 18:2 | 18:3 | 20 | 22 | 24 |
|---|---|---|---|---|---|---|---|---|---|
| 0.0 | 4.0 | 0.1 | 4.5 | 84.9 | 4.6 | 0.0 | 0.6 | 1.1 | 0.2 | giving a total SAFA level of 10.1 wt %.

The triglyceride part contained 20 wt % of SOO and 65.9 wt % of OOO.

1.3 The glyceride compositions of the refined fat A, of the starting oil (=Fat B), of a chemically made product (Fat C), of coconut oil (Fat D) and of the second enzymically made fat (=E) were as follows:

| | (Wt %) | | |
|---|---|---|---|
| Fat | Triglyceride | Diglyceride (1,3 + 1,2) | Monoglyceride |
| A | 14.2 | 80.3 | 5.5 |
| B | 98.0 | 2.0 | — |
| C | — | 98 | 2 |
| D | 98.0 | 2 | — |
| E | 44.4 | 55.5 | 0.1 |

The melting profile of the refined fat composition was measured. Fat C is a product that is made using a chemical conversion with a base; Fat D is coconut oil.

| Solids | Temperature (°C.) | | |
|---|---|---|---|
| Fat | 0 | 20 | 25 |
| A | 42.0 | 2.7 | 0.1 |
| B | 4.1 | | |
| C | 63.5 | 18.8 | 10.7 |
| D | 89.0 | 37.6 | 0 |
| E | 34.4 | 0.2 | 0 |

2. Ice-cream coatings

2.1 Ice-cream coatings were prepared, using the following recipe:

| Recipe: | wt. % |
|---|---|
| sugar | 42.7 |
| fat | 38.1 |
| cocoa powder D-11-MC | 12.5 |
| SMP | 6.2 |
| lecithin | 0.5 |

The fats applied were: cocoa butter (=CB), coconut oil (CN) and the refined enzymic conversion product of Example 1.1 and 1.2.

2.2 Ice creams were dipped in a melt of the above-mentioned ice-cream coating compositions.

The following results were obtained:

| Fat | Coating T (°C.) | Dripping time (sec) | Drying time (sec) | wt. % of coating |
|---|---|---|---|---|
| CB | 40.5 | 17 | 122 | 36 |
| Enz. conv. product A | 41.0 | 25 | 99 | 26 |

-continued

| Fat | Coating T (°C.) | Dripping time (sec) | Drying time (sec) | wt. % of coating |
|---|---|---|---|---|
| CN | 38.5 | 22 | 73 | 36 |
| Enz. conv. product E | 40 | 23 | 97 | 32 |

The oral properties of the products were similar (all good-tasting). However the products according to the invention resulted in coatings that were softer and less brittle, which had quicker and smoother meltdown than CB-based coatings.

We claim:

1. A fat composition suitable for an ice-cream coating comprising from 50–90 wt. % of diglycerides and from 50–10 wt. % of a vegetable triglyceride composition, said diglycerides having an SU content of 10–25 wt. % where S represents saturated fatty acid residue having 12–24 C atoms and U represents oleic acid residue, a $U_2$ content of 75–90 wt. % and an $S_2$ content below 5 wt. %, the vegetable triglyceride composition having a total ($U_3$+$SU_2$) content of at least 50 wt. % and said fat composition displaying a SAFA content of 5–35 wt. % and an N line (NMR pulse, not stabilized) of $N_{20}$<35 and $N_{25}$<10.

2. Fat composition according to claim 1, wherein the fat composition displays an $N_0$>35.

3. Fat composition according to claim 1, wherein S has 16–22 C atoms.

4. Ice-cream coating composition comprising:

35–55 wt. % of a polysaccharide;

25–65 wt. % of the fat composition according to claim 1;

0–20 wt. % of cocoa powder;

0–10 wt. % of a milk component;

0–2 wt. % of an emulsifier.

5. Coated ice creams wherein the ice-cream coating consists of the ice-cream coating according to claim 4.

6. A coating composition according to claim 4, wherein the polysaccharide is sugar, the milk component is skim-milk powder, and the emulsifier is lecithin.

7. A fat composition according to claim 1, where $N_{20}$= 1.0–20, $N_{25}$<1.0 and $N_0$ of 45–80.

* * * * *